Patented Nov. 7, 1939

2,179,028

UNITED STATES PATENT OFFICE 2,179,028

FILTERING

William H. Alton, Westport, Conn., assignor to R. T. Vanderbilt Company, Incorporated, New York, N. Y., a corporation of New York No Drawing. Application November 3, 1936, Serial No. 108,979

5 Claims. (Cl. 210—203)

This invention relates to improvements in filtering and includes a new composite refining and filtering material and an improved process of refining and filtering therewith. The invention relates particularly to improvements in so-called contact filtration and in an improved composite filtering medium for use therein.

In contact filtration processes the liquid to be refined or purified is admixed with the finely divided contact material and the liquid and admixed material are then subjected to filtration to remove the finely divided material and admixed or absorbed or adsorbed constituents or impurities. The removal of the suspended material is commonly effected by passing the liquid through a filter cloth or fabric which will hold back the finely divided material while permitting the purified or refined liquid to pass therethrough.

In practice, there is a limit to the fineness or mesh of the filtering cloth or fabric, since screens of less than around 100 mesh are expensive and lacking in strength and not well adapted to withstand handling and usage such as scraping of the cloth or fabric to remove deposited materials. On the other hand, the most effective materials for use in contact filtration are those which have a particle size much less than 100 mesh and which would readily pass through a 100 mesh screen.

The present invention provides improved composite filtering media, particularly adapted for use in contact filtration processes, which enable the full benefit to be obtained from finely divided contact media of e. g. around 200 mesh or 250 mesh or even 300 mesh or finer, and which enables the process to be carried out with filtration through ordinary filter screens of e. g. 27 by 100 mesh.

The new composite filtering medium is made up for the most part of a finely divided contact or absorbent material having particles below e. g. 200 mesh and of a size down to as small as about 1 micron, intimately admixed with and associated with fibrous talc having coarser particles or fibres of a size greater than about 100 mesh, and with the fine particles so intimately admixed or associated with the coarser particles of fibrous talc as to give a new composite material substantially homogeneous in character.

The fibrous talc which is particularly advantageous for use in the new composite medium is in the form of fibres of a size e. g. which may be sifted up to a 14 mesh screen and may contain fibres passing through a 100 mesh screen, when the composite medium is to be used on a screen of about 27 by 100 mesh, that is, a screen with 100 wires to the inch in one direction and 27 to the inch in the other direction, which is a common size of filter screen, and is the form of talc commonly known as "asbestine." The fibrous talc by itself would not be a particularly effective contact filtering medium and in particular would not effectively remove the finer particles from the material to be filtered which are desirably removed in contact filtration processes.

A finely divided material which is particularly advantageous for use with the fibrous talc is pyrophyllite of a size, e. g., that passes through a screen of 200 or 250 mesh and with particles which may be as small as 1 micron.

The structure of the larger particles or fibres of the fibrous talc is such that the fine pyrophyllite particles appear to stick to the fibrous talc to fill the interstices and crevices between the fibres in such a way as to produce a composite aggregate made up of the individual particles or fibres of the fibrous talc and the finer particles of pyrophyllite intimately associated therewith.

The properties of the fibrous talc and of the pyrophyllite are such that when admixed in suitable proportions a homogeneous mixture is obtained which may be shipped in a dry state without objectionable separation or segregation, and which, when added to a liquid, appears to retain the intimate association of the particles even though there may be a considerable excess of the fine pyrophyllite particles admixed with the aggregate.

The proportions of fibrous talc and pyrophyllite which may be used vary, and the proportion of fibrous talc may advantageously vary from around 5% to around 10 to 25%, or even much more of the fibrous talc, e. g., up to 50% may be used, where the fibres are of a size which may be sifted through a 14 mesh screen but not through a 100 mesh screen, and where the size of the pyrophyllite particles is such that they will pass through a 250 mesh screen.

While fibrous talc alone gives a relatively ineffective and coarse filtering medium, when the pores and interstices between the fibres are filled with pyrophyllite and when the fibres are admixed with a large proportion of a fine pyrophyllite, the resulting composite product forms an effective contact filtering composition which is not subject to the objections and difficulties encountered in the use of the finely divided material by itself.

The fibrous talc is particularly advantageous for use in the composite media, because it is quite cheap, and because the fibres are resistant to acids and to alkalies, and are not readily subject to deterioration.

In place of the pyrophyllite, which is particularly advantageous, other finely divided contact or absorbent materials may be used. Among such absorbent or contact materials which may be used are talc, in other forms than the fibrous form, fired clay, acid-treated clay, amorphous silica, and spent or calcined fuller's earth. Such materials should, of course, be finely divided as described above with reference to the pyrophyllite, and should be thoroughly admixed with the fibrous talc.

A number of these materials, such as fuller's earth, have bleaching properties; but heretofore have not been available for use with pressure filters in bleaching operations, because such materials, to be effective bleaching agents must be in the form of very finely divided powders, such that the particles pass through the openings in the filter screens and do not build up a cake or layer on the screens. When suitably admixed with fibrous talc, in accordance with the present invention, these materials may be used with advantage in pressure filtering operations when sufficiently finely divided to serve as effective bleaching agents.

An important advantage of the present invention is that it provides a means by which extremely finely divided contact or absorbent materials which otherwise cannot be used alone in filtration operations, particularly in contact filtration operations, are made available for such use. Such materials as spent or calcined fuller's earth ordinarily have a particle size which is too small to allow them to be used as contact filtration agents, but when admixed with fibrous talc to form a composite medium such as herein described, the extremely finely divided absorbent materials may be used with great advantage. The reason why such finely divided materials cannot ordinarily be used for contact filtration is that, with screens which are practical for use, the finely divided material does not form a bed on the screen and passes through the screen without filtering the liquid material. If, on the other hand, the finely divided contact material is admixed with fibrous talc to form a composite product, it may be used with screens of the usual mesh; and the finely divided material is more effective for the removal of suspended particles than the coarser material which is ordinarily used, because of the increased surface which it has and because of the increased intimacy of contact of the finely divided material with the liquid treated. There are available various types of fuller's earth or very fine clay, so finely divided that they have no practical use as filtration agents when used in accordance with the usual practice; but when admixed with fibrous talc to form a composite product, these finely divided clays or fuller's earths, otherwise useless for contact filtrations, may be advantageously used. For example, the Atapulgus Clay Company has available a type of fuller's earth which is so finely divided as to be of no use for filtration operations when used in accordance with usual practice, but which, when compounded into a composite medium with fibrous talc, may be used with advantage.

In using the new composite medium, it may be admixed with the liquid to be refined or filtered in much the same manner that contact filtering media are now used, but with the advantages resulting from the use of the composite material having the finely divided contact material in association with fibrous talc, both in the refining treatment itself and in the subsequent removal of the contact medium by filtration. The composite medium can thus be added in a dry state to the liquid to be refined or filtered, and intimately admixed therewith to permit absorption or adsorption of impurities, etc. on the finely divided material; and the liquid and admixed filtering agents can then be passed through a filter, such as a pressure filter or a vacuum filter, or gravity filtration may be used. The presence of the fibrous talc, or of aggregates of the fibrous talc and the fine particles of contact material, permits the ready removal of the filtering material by an ordinary filter screen through which the fine particles of contact material would otherwise freely pass, and in this way the filtering medium is removed; both the fibrous talc, the aggregates of finely divided contact material and fibrous talc, and the finely divided contact material being completely removed.

In the handling of various liquids which are to be subjected to contact filtration it is frequently necessary to pump the liquids, and the presence of coarse particles of abrasive material would be objectionable. The presence of the composite aggregates or particles of the new medium has no objectionable abrasive action and the liquid and admixed medium can be readily pumped, e. g. with a centrifugal pump.

The new composite material can be advantageously used in refining or purifying various liquids. For example, the new composite medium is an advantageous medium for use in the purifying of cleaners' naphtha. When such naphtha is used for cleaning clothes it requires refining or purification before it can be used over again. The admixture of a small amount of the new composite material with the impure cleaners' naphtha and the filtering of the admixed naphtha and medium through a pressure filter results in effective removal of the medium itself as well as effective adsorption or absorption or physical removal of suspended and other impurities, giving a purified cleaners' naphtha which can be used over again. The new composition has the further advantage that it can be added to the cleaners' naphtha before or during the cleaning of clothes therewith, so that it is present in the naphtha during the cleaning operation, and it is readily removed from the clothes with the naphtha such that the naphtha can then be subjected to filtration in a continuous manner and the purified naphtha can then be returned for use, e. g. in rinsing the clothes, recirculating the same naphtha through the clothes with the purification of the naphtha by the use of the new composite material and the filtering of this material and impurities from the naphtha as a part of the cycle.

The effectiveness of the new contact composite filtering medium is such that when used for the refining and purification of cleaners' naphtha, the redistillation cost, that is, the cost of distilling the naphtha to purify and recover it as is commonly done, may be drastically cut. The naphtha can be used many more times without requiring distillation to purify and refine it.

The composite filtering medium of the present invention may be also used with advantage for the contact filtration of such materials as gasoline, reclaimed oil, oils and fats, mineral oils, sugar solutions, beer, cider, vinegar, liquors, fruit juices, etc. In some cases, as with cleaners' naphtha, and with some of the contact or absorbent materials, such as pyrophyllite, it may be desirable to incorporate a small proportion of bleaching clay, e. g. 10% in the composite material to aid in decolorizing the material filtered. Pyrophyllite removes suspended material and dirt from liquids effectively, but does not decolorize the liquid. Other contact or absorbent materials, such as fuller's earth, and other finely divided clays, which may be used in the new composite media, do have bleaching properties, particularly when used in the very finely divided condition in which the present invention enables them to be used, and may decolorize as well as remove suspended and other impurities. Where a decolorizing action is desired, and the contact or absorbent material used has no decolorizing action, or insufficient decolorizing action, a small proportion of bleaching clay or other bleaching agent, admixed with the composite medium makes the material more effective in that it provides a medium which not only serves to remove suspended matter but also serves to decolorize.

Where a highly active decolorizing action is desired, a composite medium consisting of fibrous talc in admixture with a finely divided decolorizing or bleaching agent, such as bleaching clay, activated charcoal, bone-black or the like, may be used with advantage, the fibrous talc enabling the use of the bleaching or decolorizing agent in an extremely finely divided state, e. g., of a size such that it will pass a 50 mesh screen and be retained on a 200 mesh screen, or even a more finely divided bleaching or decolorizing agent may be used. Or an effective medium for decolorizing or bleaching may be obtained by the intimate admixture of such finely divided bleaching or decolorizing agent, such as bleaching clay, charcoal, bone-black or the like, with about an equal proportion of a finely divided contact or absorbent material such as pyrophyllite, e. g. of a size which will pass a 200 or 250 mesh screen, and a relatively small proportion e. g. 5 to 25% of fibrous talc. Such a composition has a bleaching or decolorizing action fully as great as that of the bleaching agent alone, the contact or absorbent material serving as a surface extender for the bleaching agent, and to remove suspended material, so that the bleaching agent is available to exert its full bleaching or decolorizing action, and is not required to remove suspended material as well as to bleach and decolorize.

The composite medium of the present invention may also be used to advantage as a contact medium where after admixture with the liquid to be refined or purified, it is allowed to settle and is removed from the liquid by decantation. The fibrous talc admixed with the contact or absorbent material holds the settled cake together and bonds it so that the fine powder does not stir up so readily and become admixed again with the liquid.

I claim:

1. A new filtering medium adapted for contact filtration comprising a major proportion of finely divided pyrophyllite intimately admixed with and associated with from about 5% to about 50% of fibrous talc.

2. A new filtering medium adapted for contact filtration comprising a major proportion of a finely divided pyrophyllite substantially all of which will pass a 200 mesh screen intimately admixed with and associated with from about 5% to about 50% of fibrous talc.

3. A new filtering medium adapted for contact filtration comprising a major proportion of a finely divided pyrophyllite, substantially all of which will pass a 200 mesh screen, intimately admixed with and associated with from about 5% to about 50% of fibrous talc, substantially all of which will pass a 14 mesh screen but will be retained on a 100 mesh screen.

4. A new filtering medium as in claim 1 which contains from about 5 to about 25% of fibrous talc, the balance being finely divided pyrophyllite.

5. In the filtering of liquids to refine or purify them by removing suspended and other impurities, the improvement which comprises adding to said liquid finely divided pyrophyllite and fibrous talc in an amount of from about 10% to about 100% of the pyrophyllite, and passing the resulting liquid and admixed filtering material through a filter whereby a filtering bed of admixed fibrous talc and pyrophyllite is built up to insure a fine straining action on the passing liquid.

WILLIAM H. ALTON.